(12) United States Patent
Pitcher et al.

(10) Patent No.: US 8,458,942 B2
(45) Date of Patent: Jun. 11, 2013

(54) ALIGNMENT GUIDE FOR AN OVERHEAD TRACK SUPPORT ARRANGEMENT

(75) Inventors: David E. Pitcher, Swampscott, MA (US); Rebecca C. Suciu, Lynn, MA (US); Thomas P. Burrous, Haverhill, MA (US); Alan L. Stenfors, Scituate, MA (US); Sidney Rose, Marblehead, MA (US)

(73) Assignee: Rose Displays, Ltd., Salem, MA (US)

( * ) Notice: Subject to any disclaimer, the term of this patent is extended or adjusted under 35 U.S.C. 154(b) by 303 days.

(21) Appl. No.: 12/803,525

(22) Filed: Jun. 29, 2010

(65) Prior Publication Data

US 2011/0005112 A1    Jan. 13, 2011

Related U.S. Application Data

(63) Continuation-in-part of application No. 11/799,001, filed on Apr. 30, 2007, now Pat. No. 7,743,541.

(51) Int. Cl.
*G09F 3/20* (2006.01)
*G09F 7/22* (2006.01)
*G09F 15/00* (2006.01)
*G09F 3/00* (2006.01)

(52) U.S. Cl.
USPC ............... 40/658; 40/617; 40/308; 40/324; 40/608; 248/343; 24/3.1; 24/10 R; 403/252; 403/253; 403/326; 52/38; 52/39

(58) Field of Classification Search
USPC   40/658, 617, 308, 324, 608; 248/343; 24/3.1, 24/10 R; 403/252, 253, 326; 52/38, 39
See application file for complete search history.

(56) References Cited

U.S. PATENT DOCUMENTS

| 4,882,862 | A  | * | 11/1989 | Slavsky, Sr. | 40/324 |
| 7,784,745 | B2 | * | 8/2010 | Dodge | 248/73 |
| 7,900,419 | B2 | * | 3/2011 | Kodi | 52/745.21 |
| 2009/0056186 | A1 | * | 3/2009 | Pitcher et al. | 40/617 |

* cited by examiner

*Primary Examiner* — Joanne Silbermann
*Assistant Examiner* — Syed A Islam
(74) *Attorney, Agent, or Firm* — Don Halgren

(57) ABSTRACT

An alignment guide for maintaining perpendicularity between an elongated anchor rail secured to an overhead support and a sign supporting elongated adjustment rail, comprising: a guide housing having an anchor rail receiving channel arranged across an upper surface thereof; an adjustment rail receiving channel arranged across a lower side of the guide housing, wherein the anchor rail receiving channel and the adjustment rail receiving channel are perpendicular to one another.

1 Claim, 5 Drawing Sheets

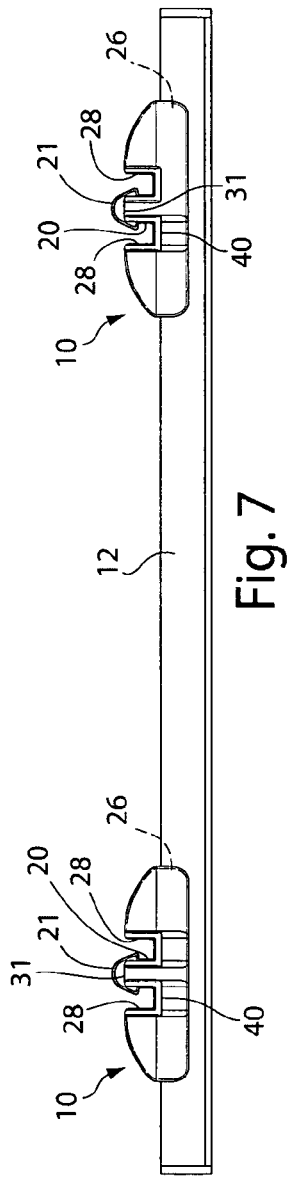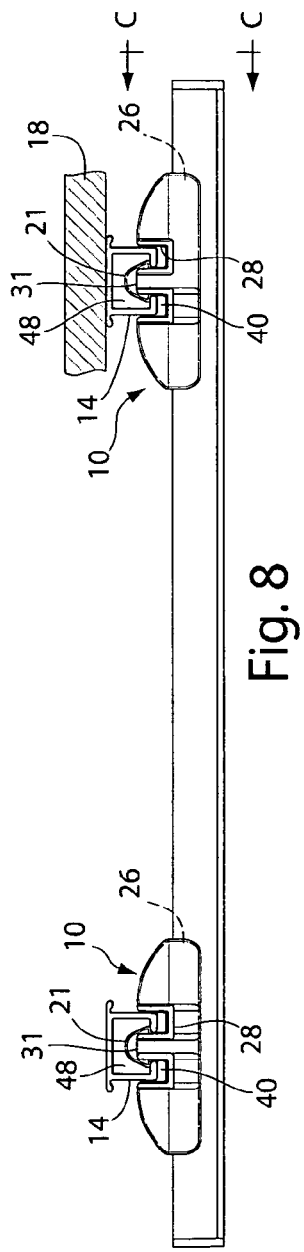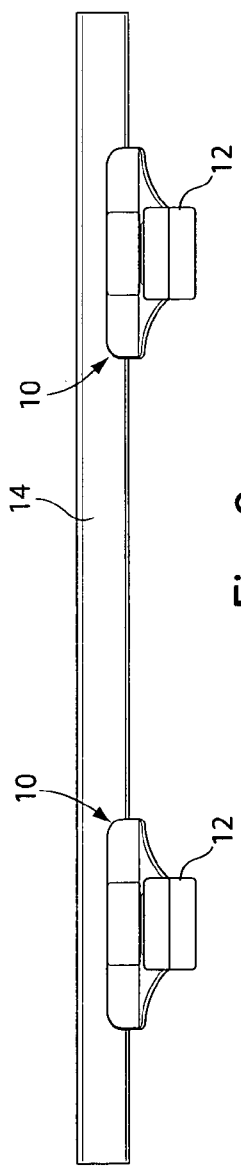

ALIGNMENT GUIDE FOR AN OVERHEAD TRACK SUPPORT ARRANGEMENT

BACKGROUND OF THE INVENTION

1. Field of the Invention

The present invention relates to overhead track supports and more particularly, to a guide member for facilitating the controlled, aligned movement of portions of the overhead track arrangement by keeping it in proper perpendicular relationship during its biased motion, and incorporates herein by reference U.S. Pat. No. 7,712,239, in its entirety, and is a continuation-in-part application of Ser. No. 11/799,001, filed Apr. 30, 2007, incorporated herein in its entirety.

2. Discussion of Art

Overhead sign displays are often installed and manipulated by personnel who aren't necessarily well trained or motivated to do that task. The adjustable track support arrangement disclosed in the aforementioned '239 patent describes a pair of parallel anchor rails supported onto an overhead support or ceiling or the like, to which a pair of elongated adjustment rails are supported. Display signs or other advertising indicia are to be supported beneath the adjustment rails. There is a "coat hanger" shaped slideable connector arranged between the (lower) elongated adjustment rails and the (uppermost) elongated anchor rails. The object is to individually slide, when needed, one (or more) elongated adjustable anchor rail between and along the length of a pair of parallel, spaced-apart elongated anchor rails, while maintaining the perpendicularity of the adjustment rail(s) with respect to the elongated anchor rails. The "coat hanger" shaped connector between the elongated adjustable rail and the elongated anchor rails permits an axis for swiveling of the elongated adjustment rail with respect to the elongated anchor rails, and hence does not permit a simple sliding relationship in which the moving elongated adjustment rail is easily maintained orthogonal or perpendicular to the anchor rails during its relative supportive movement therebetween.

It is an object of the present invention to improve upon the overhead track support arrangement, and is a further object of the present invention to provide an alignment member which will facilitate proper guided movement between an adjustment rail and the anchor rails to which it is attached.

It is yet a still further object of the present invention to provide an aligned connectivity arrangement between the adjustment rail and the anchor rails wherein a biasing pressure placed anywhere along the longitudinal side or axis of the adjustment rail will effectuate movement of that adjustment rail without disturbing its perpendicular relationship therebetween.

BRIEF SUMMARY OF THE INVENTION

The present invention relates to an alignment guide for properly keeping an elongated adjustable rail properly aligned in a perpendicular relationship with an overhead elongated anchor rail as part of an overhead track support arrangement. The overhead track support arrangement comprises a pair of elongated anchor rails supported to a ceiling or to support members supported from a ceiling or the like. The overhead track support arrangement also includes at least one elongated adjustment rail supported beneath and between those parallel elongated anchor rails. Each elongated adjustment rail comprises a generally U-shaped extrusion, in cross section. Each elongated anchor rail comprises a similarly U-shaped in cross section extrusion, except that when the elongated anchor rail is assembled, it is in inverted or upside down "U", when supported from an overhead support.

The elongated adjustment rail is secured to the elongated anchor rail by the "coat hanger" shaped connector mated therebetween, in their respective central channels, as shown in the U.S. Pat. No. 7,712,239, incorporated herein as cited hereinabove. That hanger shaped connector is now supportively enclosed by an alignment guide. The alignment guide comprises a housing having a single, lower, elongated adjustment-rail receiving-channel disposed thereacross. The alignment guide housing also has a single, upper, elongated anchor-rail receiving-channel disposed thereacross with its longitudinal axis perpendicular to the longitudinal axis of the elongated adjustment-rail receiving-channel therebeneath. The upper anchor-rail receiving-channel is subdivided by a central alignment-guide arranged at each end thereof. The elongated (lower) adjustment-rail receiving-channel also has a pair of opposed pressure bumps extending therefrom, to engage and provide a frictional bias against an elongated adjustment rail received therein.

The overhead track support arrangement is assembled as recited in the afore-mentioned '239 patent. However, prior to the insertion of the hanger shaped connector into sliding relationship in the elongated anchor rail, the alignment guide is fitted over the "hanger" shaped connector and onto a straddling relationship with the elongated adjustment rail, so that the elongated adjustment rail receiving channel of the alignment guide slides on the elongated adjustment rail, with the "hanger" shaped connector extending through the central opening of the alignment guide. The "hanger" shaped connector bisects the elongated anchor rail receiving channel, and provides supportive connectivity between the upper elongated anchor rail and the lower elongated adjustment rail. The upper or head end of the hanger shaped connector may be slid into the open end of the elongated anchor rail, but is preferably snapped into the elongated slot of the elongated anchor rail after being inserted or slid into the open end of the elongated hollow, extruded "U" shaped adjustment rail. The alignment guide thereby is captured between the upper anchor rail and the lower adjustment rail, with the elongated anchor rail thus being in an aligned sliding relationship with the elongated anchor rail receiving channel.

The elongated anchor rail, of generally "U" shape in cross-section, has an elongated slot facing downwardly in its assembled orientation. The central alignment guide, which faces upwardly, is mated with the elongated slot of the inverted, "U" shaped, elongated anchor rail. The side walls of the elongated anchor rail registering in those receiving channels on either side of the central alignment guide. The elongated adjustment rail receiving channel of the alignment guide is directed downwardly and slidingly receives the elongated adjustment rail therewithin.

Transverse pressure anywhere along the side walls of the elongated adjustment rail permits that adjustment rail to be slid along the longitudinal axis of the elongated anchor rail while maintaining its orthogonal or perpendicular orientation therewith. This is because the elongated anchor rail receiving channels and the elongated adjustment rail receiving channels of the rigid housing of the alignment guide are normal or perpendicular to one another, holding the respective rails in a fixed orientation sliding relationship to maintain that perpendicularity therebetween. The pressure bumps on the opposed sides of the elongated adjustment rail receiving channel act to minimize longitudinal displacement of the alignment guide until the elongated adjustment rail is connected in a sliding relationship with the anchor rail. The receiving channel serves the purpose of minimizing non-orthogonal movement between the anchor rails and the adjustment rail.

The invention thus comprises an alignment guide for maintaining perpendicularity between an elongated anchor rail secured to an overhead support and a sign supporting elongated adjustment rail, comprising: a guide housing having an anchor rail receiving channel arranged across an upper surface thereof; an adjustment rail receiving channel arranged across a lower side of the guide housing, wherein the anchor rail receiving channel and the adjustment rail receiving channel are perpendicular to one another.

The guide housing preferably has a central connector-receiving opening for receipt of a "hanger" shaped rail connector therethrough. The adjustment rail receiving channel preferably has a pressure bump arranged therein. The anchor rail receiving channel preferably has central alignment guide arranged along end portions of the anchor rail receiving channel. The anchor rail receiving channel preferably is bisected by the central connector receiving opening.

The invention also comprises a method to maintain perpendicularity between a pair of elongated, overhead, parallel anchor rails secured to an overhead support, and at least one sign supportable, elongated, adjustment rail slidable between the parallel, overhead attached anchor support rails, comprising: one or more of the following: inserting a "hanger' shaped connector into a hollow channel of the elongated adjustment rail; placing an alignment guide over the hanger shaped connector, the alignment guide having a lower channel arranged to straddle the adjustment rail; and inserting a head of the hanger shaped connector into a hollow channel of the anchor support rail, and sliding the head of the hanger shaped connector into the hollow channel of the anchor support rail and simultaneously sliding an upper anchor receiving channel about the anchor rail.

The invention thus further comprises an alignment guide for maintaining perpendicularity between an elongated anchor rail secured to an overhead support and a sign supporting elongated adjustment rail, comprising: a guide housing having an anchor rail receiving channel arranged across an upper surface thereof; an adjustment rail receiving channel arranged across a lower side of the guide housing, wherein the anchor rail receiving channel and the adjustment rail receiving channel are perpendicular to one another; the guide housing having a central connector-receiving opening for receipt of a "hanger" shaped rail connector normally through both the anchor rail receiving channel and the adjustment rail receiving channel; the adjustment rail receiving channel having at least one pressure bump arranged therein; the anchor rail receiving channel having a central alignment flange arranged along end portions of the anchor rail receiving channel, bisecting the anchor rail receiving channel; the anchor rail receiving channel and the adjustment rail receiving channel are bisected by the central opening; the head of the hanger shaped connector extends distally beyond the upper surface of the guide flange when it is disposed within the anchor rail; the anchor rail receiving channel is bisected by the central connector receiving opening; the adjustment rail receiving channel is bisected by the central connector receiving opening; the anchor rail and the adjustment rail have common cross-sectional configurations; the adjustment rail being arranged to slide longitudinally therewithin and the anchor rail being arranged to allow longitudinal sliding therewithin.

The invention also further comprises a method to maintain perpendicularity between a pair of elongated, overhead, parallel, hollow-channeled anchor rails secured to an overhead support, and at least one sign supportable, elongated, hollow-channeled adjustment rail slidable between the parallel, overhead-attached anchor support rails, comprising one or more of the following: inserting a "hanger' shaped connector into the hollow channel of the elongated adjustment rail; placing an alignment guide over the hanger shaped connector, the alignment guide having a lower channel arranged to straddle the adjustment rail; and inserting a head of the hanger shaped connector into the hollow channel of the anchor support rail and simultaneously capturing the upper anchor rail within the upper anchor receiving channel thereby; moving the adjustment rail with respect to the alignment guide; moving the alignment guide with respect to the anchor rail; moving the alignment guide with respect to the anchor rail and moving the adjustment rail with respect to the alignment guide simultaneously; arranging a friction means in the adjustment rail receiving channel to minimize slip of the adjustment rail during insertion into the anchor rail thereof.

BRIEF DESCRIPTION OF THE DRAWINGS

The objects and advantages of the present invention will become more apparent when viewed in conjunction with the following drawings in which:

FIG. 7 is a side elevation overview taken along the lines B-B of FIG. 6;

FIG. 8 is a view similar to FIG. 7 showing a set of elongated anchor rails in a mating relationship with the hanger shaped connector and with the alignment guide; and FIG. 9 is a view taken along the lines C-C of FIG. 8.

DETAILED DESCRIPTION OF THE PREFERRED EMBODIMENTS

Figure 1:
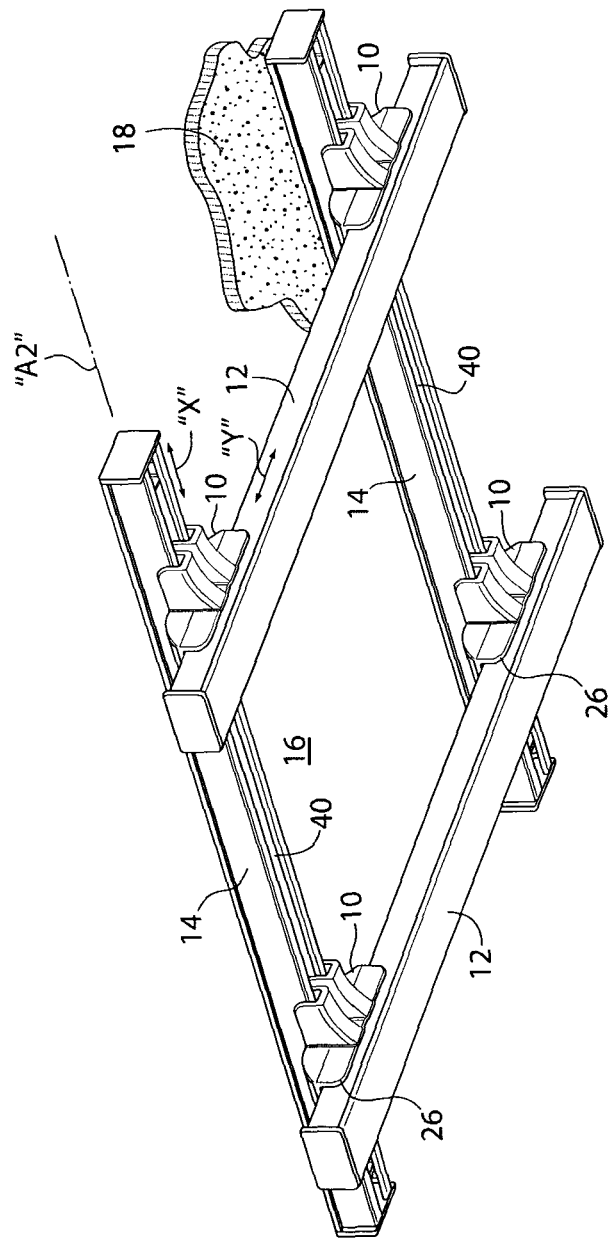
FIG. 1 is a perspective view of an overhead track system looking upwardly shown in an overhead secured orientation, with a set of alignment guides shown arranged between respective elongated anchor rails and elongated adjustment rails.

Referring now to the drawings in detail and more particularly to FIG. 1, there is shown the present invention which comprises an alignment guide 10 for properly keeping an elongated, transversely and longitudinally displaceable adjustable rail 12 properly perpendicularly aligned, both during its positioning movement and subsequent overhead placement in a proper orthogonal and perpendicular relationship with an overhead elongated anchor rail 14 as part of an overhead track support arrangement 16.

The overhead track support arrangement 16 preferably comprises a pair of elongated anchor rails 14 securely supported onto a ceiling 18 or to support members (not shown for clarity) supported from a ceiling or the like. The overhead track support arrangement 16 also includes at least one elongated displaceable adjustment rail 12 supported beneath and between those parallel elongated anchor rails 14, as represented in FIG. 1. Each elongated adjustment rail 12 comprises a generally U-shaped extrusion, having a hollow channel 23 therein, and has a longitudinal axis A1, as may be seen best in FIGS. 1 and 5. Each elongated anchor rail 14 comprises a similarly U-shaped (in cross section) extrusion, with a hollow channel 48 therein, having a longitudinal axis A2, as may be seen in FIGS. 1 and 8, except that when the elongated anchor rail 14 is assembled, it is in inverted as an upside down "U", when supported from an overhead support, as represented in FIGS. 1, 8 and 9.

Figure 2:
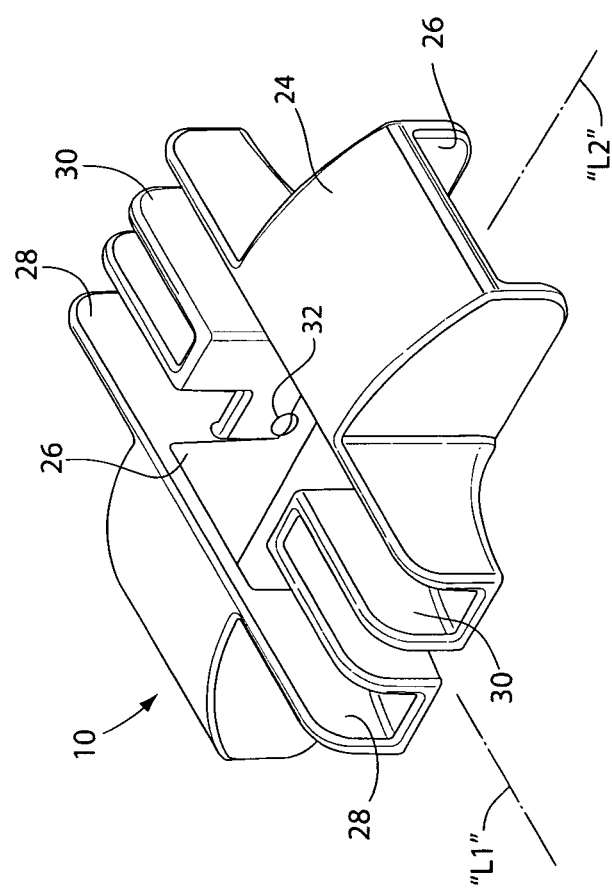
FIG. 2 is a perspective view of an alignment guide.
Figure 3:
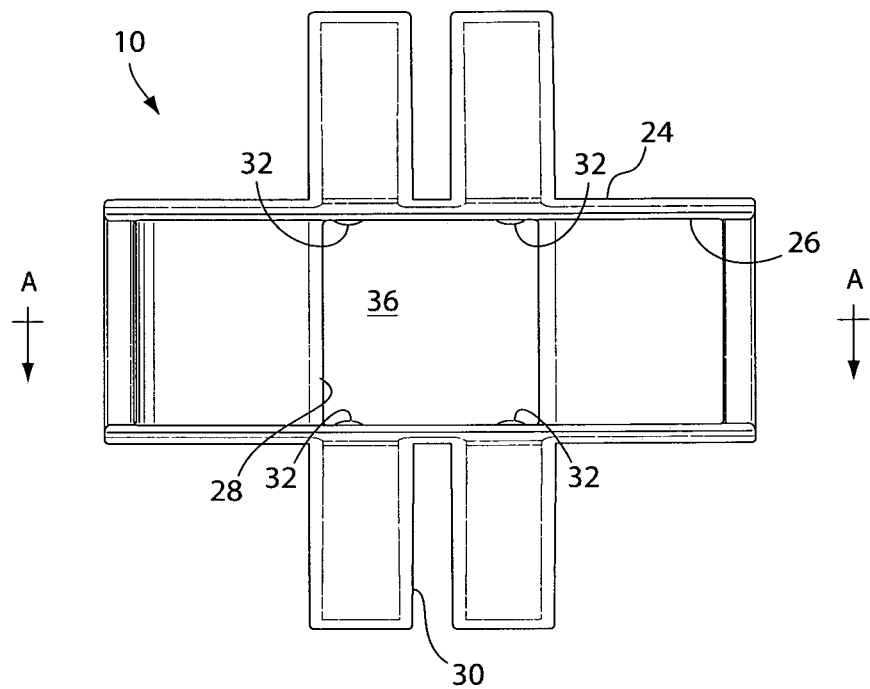
FIG. 3 is a bottom view of the alignment guide or shown in FIG. 2.
Figure 4:
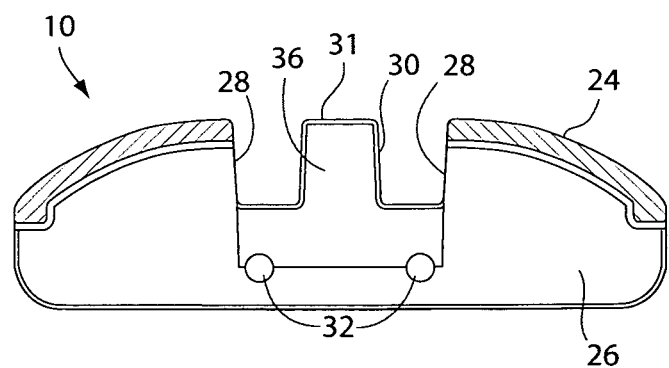
FIG. 4 is a sectional view taken along the lines A-A of FIG. 3.

The elongated adjustment rail 12 is secured to the elongated anchor rail 14 preferably by a rail connector 20 (appearing as "coat hanger" shaped) mated therebetween, in their respective hollow central channels 23, as shown in FIGS. 5, 6, 7 and 8 herein, and as also shown (as #50) in the U.S. Pat. No. 7,712,239, incorporated herein by reference as cited hereinabove. That "hanger-shaped" rail connector 20 is now supportively enclosed by the alignment guide 10, as represented in FIGS. 5, 6, 7 and 8. The alignment guide 10 comprises a housing 24 having a single, lower, elongated adjustment-rail receiving-channel 26 disposed thereacross, as represented in FIGS. 2, 3 and 4. The alignment guide housing 24 also has a split or end-portion-bifurcated, upper, elongated anchor-rail receiving-channel 28 disposed thereacross, with its longitudinal axis "L1" perpendicular to the longitudinal axis "L2" of the elongated adjustment-rail receiving-channel 26 therebeneath, as represented in FIG. 2. The upper anchor-rail receiving-channel 28 is subdivided or bifurcated by a central alignment flange 30 arranged at each end of the opening 36, as best represented in FIGS. 2 and 4. The opening 36 is disposed normally (perpendicularly) though both the adjustment rail receiving channel 26 and the bifurcated anchor rail receiving channel 28, as best seen in FIGS. 2 and 4. This passageway or opening 36 through both the channels 26 and 28 facilitates the simple positioning of the shaped rail connector 20 therethrough. The guide flange 30 is in longitudinal alignment with the head 21 of the shaped hanger 20, to allow for insertion of both into the slot 40 in the anchor rail 14, as may be appreciated form viewing FIG. 8. The head 21 of the shaped rail connector 20 extends distally beyond the upper surface 31 of the guide flange 30, as may be seen in FIGS. 7 and 8.

The elongated (lower) adjustment-rail receiving-channel 26 also preferably has a pair of opposed pressure bumps 32 extending therefrom as represented in FIGS. 2, 3 and 4, which bumps 32 are arranged to engage and provide a frictional bias against an elongated adjustment rail 12 received therein, as represented in FIGS. 1 and 6 through 9.

The overhead track support arrangement 16 is assembled as recited in the afore-mentioned '239 patent. The guide 10 may be adjustably moved as shown by the "x" and/or "y" arrows as indicated in FIG. 1.

Figure 5:
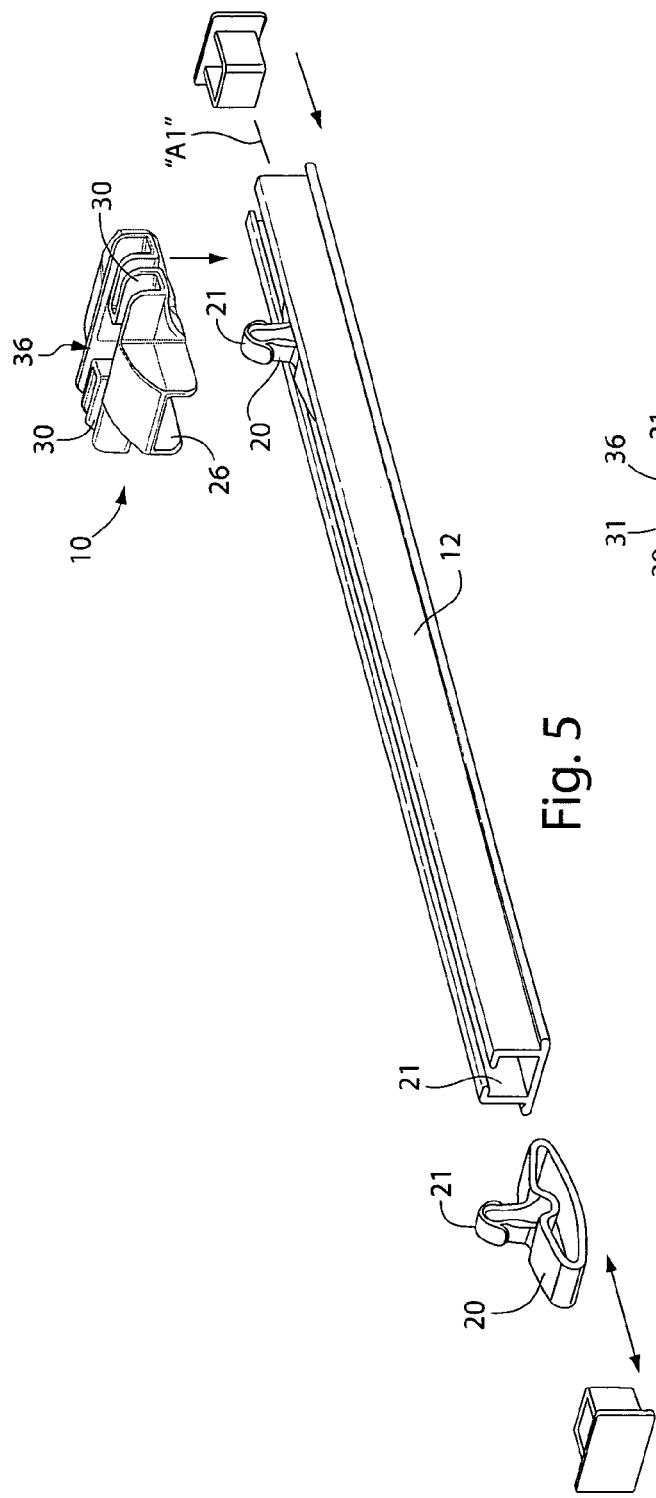
FIG. 5 is an exploded view of an elongated adjustment rail prior to its assembly.
Figure 6:
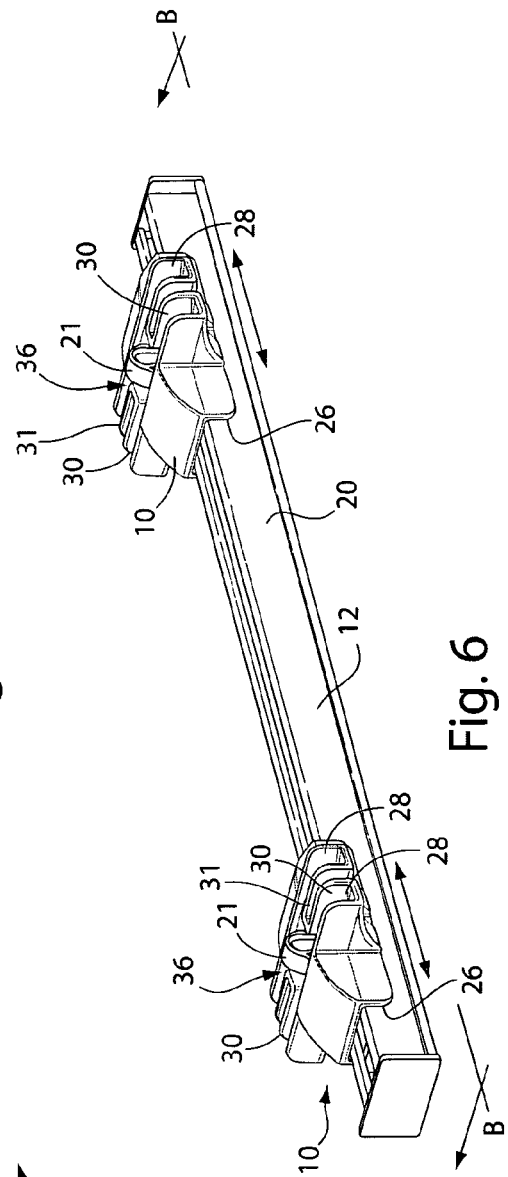
FIG. 6 is a perspective view of an elongated adjustment rail fully assembled.

However, prior to the insertion of the rail connector 20 into sliding relationship in the elongated anchor rail 14, the alignment guide 10 is fitted over the "shaped" rail connector 20 and onto a straddling relationship with the elongated adjustment rail 12, so that the elongated adjustment rail receiving channel 26 of the alignment guide 10 slides on the elongated adjustment rail 12, with the shaped rail connector 20 extending through the central opening 36 of the alignment guide 10, as represented in FIGS. 5 and 6. The shaped rail connector 20 thus bisects the elongated anchor rail receiving channel 28, as shown in FIG. 6, and provides orthogonally-maintained supportive connectivity between the upper elongated anchor rail 14 and the lower elongated displaceable adjustment rail 12, as may be seen in FIG. 8. The upper or head end 21 of the hanger shaped connector 20 may be slid into the open end of the elongated anchor rail 14, but is preferably snapped into the elongated slot 40 of the elongated anchor rail 14 after being inserted or slid into the open end of the elongated hollow, extruded "U" shaped adjustment rail 12, as represented in FIG. 5. The alignment guide 10 is thereby captured between the upper anchor rail 14 and the lower adjustment rail 12, with the elongated anchor rail 14 thus being in an aligned sliding relationship with the elongated anchor rail receiving channel 28.

The elongated anchor rail 14, of generally "U" shape in cross-section, has an elongated slot 40 facing downwardly in its assembled orientation, as is represented in FIGS. 1 and 8. The central alignment flange 30, which faces upwardly as represented in FIGS. 2, 4, 5, 6, 7 and 8, is mated with the elongated slot 40, of the inverted, "U" shaped, elongated anchor rail 14, as is best represented in FIG. 8. The side walls of the elongated anchor rail 14 slidingly register in those receiving channels 28 on either side of the central alignment flange 30, as is best represented in FIG. 8. The elongated adjustment rail receiving channel 26 of the alignment guide 10 is directed downwardly, as represented in FIGS. 1, 2 and 4, and slidingly receives the elongated adjustment rail 12 therewithin, as is represented in FIGS. 1, 5, 6, 7 and 8.

Transverse pressure anywhere along the side walls of the elongated adjustment rail 12 permits that adjustment rail 12 to be slid (displaced) along the longitudinal axis of the elongated anchor rail 14 while maintaining its orthogonal or perpendicular orientation therewith. This is because the elongated bifurcated anchor rail receiving channels 28 and the elongated adjustment rail receiving channel 26 of the rigid housing 24 of the alignment guide 10 are in a multiple path guiding relationship and are normal or perpendicular to one another, as represented in FIG. 3, holding the respective rails 12 and 14 in a fixed orientation sliding relationship to maintain that perpendicularity therebetween.

The pressure bumps 32 on the opposed sides of the elongated adjustment rail receiving channel 26, as represented in FIGS. 2, 3 and 4, act to minimize longitudinal displacement alignment guide 10 until the elongate adjustment rail 12 is connected in sliding relationship with the anchor rail 14. The receiving channel 26 serves the purpose of minimizing non-orthogonal or skewed movement and positioning between the anchor rails 12 and the adjustment rail 12.

We claim:

1. An alignment guide arrangement for maintaining perpendicularity between an elongated anchor rail secured to an overhead support and a sign supporting elongated adjustment rail by a rail connector arranged therebetween, the guide arrangement, comprising:

a guide housing having an anchor rail receiving channel arranged across an upper surface thereof;

an adjustment rail receiving channel arranged across a lower side of the guide housing, wherein the anchor rail receiving channel and the adjustment rail receiving channel are perpendicular to one another;

wherein the guide housing has a central connector-receiving opening for receipt of a "hanger" shaped rail connector normally through both the anchor rail receiving channel and the adjustment rail receiving channel;

wherein the adjustment rail receiving channel has at least one pressure bump arranged therein; wherein the anchor rail receiving channel has central alignment flange arranged along end portions of the anchor rail receiving channel, bisecting the anchor rail receiving channel;

wherein the anchor rail receiving channel and the anchor rail receiving channel are bisected by the central opening; wherein the connector extends distally beyond the guide flange within the anchor rail;

wherein the anchor rail receiving channel is bifurcated by the central connector receiving opening; wherein the adjustment rail receiving channel is bisected by the central connector receiving opening;

wherein the anchor rail and the adjustment rail have common cross-sectional configurations; and wherein the adjustment rail is arranged to slide longitudinally therewithin and the anchor rail is arranged to allow longitudinal sliding therewithin.

* * * * *